United States Patent
Koyama et al.

(10) Patent No.: US 7,023,518 B1
(45) Date of Patent: *Apr. 4, 2006

(54) SEMICONDUCTOR DEVICE HAVING A NON-CONDUCTIVE MATERIAL OR A WEAKLY CONDUCTIVE MATERIAL APPLIED TO A SIDE EDGE OF A SUBSTRATE AND A METHOD OF FABRICATING THE SAME

(75) Inventors: Jun Koyama, Kanagawa (JP); Yoshitaka Yamamoto, Nara (JP)

(73) Assignees: Semiconductor Energy Laboratory Co., Ltd., Atsugi (JP); Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/770,792

(22) Filed: Dec. 19, 1996

(30) Foreign Application Priority Data

Dec. 19, 1995 (JP) ................................. 7-349228

(51) Int. Cl.
 *G02F 1/1333* (2006.01)
 *G02F 1/1345* (2006.01)
 *G02F 1/1339* (2006.01)

(52) U.S. Cl. ...................... 349/151; 349/153; 349/152; 349/122; 349/154

(58) Field of Classification Search ........ 349/151–154, 349/122
 See application file for complete search history.

(56) References Cited

U.S. PATENT DOCUMENTS

| | | | | |
|---|---|---|---|---|
| 3,954,325 A | * | 5/1976 | Borden ....................... | 349/158 |
| 4,394,067 A | * | 7/1983 | Spruijt et al. ............... | 349/153 |
| 4,494,825 A | * | 1/1985 | Sasaki et al. ............... | 349/154 |
| 5,148,301 A | * | 9/1992 | Sawatsubashi et al. ..... | 349/153 |
| 5,608,232 A | | 3/1997 | Yamazaki et al. ........... | 257/66 |
| 5,610,742 A | * | 3/1997 | Hinata et al. ............... | 349/122 |
| 5,639,698 A | | 6/1997 | Yamazaki et al. .......... | 438/486 |
| 5,854,664 A | * | 12/1998 | Inoue et al. .................. | 349/92 |
| 5,879,977 A | | 3/1999 | Zhang et al. ............... | 438/166 |
| 5,897,347 A | | 4/1999 | Yamazaki et al. .......... | 438/166 |
| 5,956,579 A | | 9/1999 | Yamazaki et al. .......... | 438/151 |
| 6,011,607 A | * | 1/2000 | Yamazaki et al. .......... | 349/153 |
| 6,055,034 A | * | 4/2000 | Zhang et al. ............... | 349/151 |
| 6,072,556 A | * | 6/2000 | Hirakata et al. ............ | 349/153 |
| 6,163,357 A | * | 12/2000 | Nakamura ................... | 349/155 |
| 6,246,454 B1 | * | 6/2001 | Koyama et al. ............. | 349/40 |
| 6,288,764 B1 | * | 9/2001 | Zhang et al. ............... | 349/152 |
| 6,304,243 B1 | | 10/2001 | Kondo et al. | |

FOREIGN PATENT DOCUMENTS

EP    0 474 508    3/1992

(Continued)

*Primary Examiner*—Huyen Ngo
(74) *Attorney, Agent, or Firm*—Fish & Richardson P.C.

(57) ABSTRACT

There is disclosed a small-sized, active matrix liquid crystal display having high reliability. The liquid crystal display comprises a TFT substrate, a counter substrate, and a layer of a liquid crystal material held between these two substrates. A plurality of pixel TFTs are arranged in rows and columns on the TFT substrate. Driver TFTs forming a driver circuit for driving the pixel TFTs are formed also on the TFT substrate. All of these TFTs are in contact with the liquid crystal material directly or via a thin film. At least one end surface of the TFT substrate and the counter substrate is cut at a common position. A nonconductive or weakly conductive material is applied or adhesively bonded to at least one cut end surface. Thus, the TFTs are protected from static charges.

21 Claims, 9 Drawing Sheets

FOREIGN PATENT DOCUMENTS

| | | | | |
|---|---|---|---|---|
| EP | 0 593 266 | | 4/1994 | |
| JP | 57-32419 | | 2/1982 | |
| JP | 57-99615 | * | 6/1982 | ................ 349/153 |
| JP | 59-166984 | * | 9/1984 | |
| JP | 59-214075 | | 12/1984 | |
| JP | 61-29821 | | 2/1986 | |
| JP | 61029821 | * | 2/1986 | |
| JP | 61-177481 | | 8/1986 | |
| JP | 53-29098 | | 3/1987 | |
| JP | 401049022 A | * | 2/1989 | |
| JP | 4-13116 | | 1/1992 | |
| JP | 4-116625 | | 4/1992 | |
| JP | 404179245 A | * | 6/1992 | |
| JP | 404192446 A | * | 7/1992 | |
| JP | 4-352131 | | 12/1992 | |
| JP | 4-355720 | * | 12/1992 | ................ 349/153 |
| JP | 4-362921 | | 12/1992 | |
| JP | 405113555 A | * | 5/1993 | |
| JP | 6-123882 | * | 5/1994 | ................ 349/153 |
| JP | 6-186578 | * | 7/1994 | |
| JP | 6-186580 | | 7/1994 | |
| JP | 6-202160 | | 7/1994 | |
| JP | 6-244103 | | 9/1994 | |
| JP | 6-244104 | | 9/1994 | |
| JP | 6-258659 | * | 9/1994 | |
| JP | 6-258660 | * | 9/1994 | |
| JP | 6-289414 | | 10/1994 | |
| JP | 7-218883 | | 8/1995 | |
| JP | 410010544 A | * | 1/1998 | |

* cited by examiner

DRIVER CIRCUIT TFT  726   ←|→   PIXEL TFT  727

SEMICONDUCTOR DEVICE HAVING A NON-CONDUCTIVE MATERIAL OR A WEAKLY CONDUCTIVE MATERIAL APPLIED TO A SIDE EDGE OF A SUBSTRATE AND A METHOD OF FABRICATING THE SAME

BACKGROUND OF THE INVENTION

1. Field of the Invention

The present invention relates to an active matrix liquid crystal display and, more particularly, to a miniaturized active matrix liquid crystal display having high reliability.

2. Description of the Related Art

An active matrix liquid crystal display uses a liquid crystal as a display medium. A pixel is disposed at each intersection in a matrix construction. Every pixel is equipped with a switching device. Information about the pixels is represented by turning on and off the switching devices. Three-terminal devices which are thin-film transistors having gate, source, and drain are most often used as the switching devices. The thin-film transistors are hereinafter often abbreviated as TFTs.

In the matrix construction, scanning lines (gate lines) extending parallel to a row are connected with the gate electrodes of the TFTs in this row. Signal lines (source lines) running parallel to a column are connected with the source (or drain) electrodes of the TFTs in this column. A circuit for driving the scanning lines and a circuit for driving the signal lines are also provided.

FIG. 2 shows one conventional active matrix liquid crystal display. A signal line driver circuit 202 for driving signal lines is mounted above the pixel matrix 201 of this active matrix liquid crystal display. A scanning line driver circuit 203 for driving scanning lines is disposed to the left. Indicated by 204 is a sealant material region.

FIG. 3 is a cross section of FIG. 2. As shown in FIG. 3 pixel TFTs 301 are covered by a liquid crystal material 302, which is held between a TFT substrate 303 and a counter substrate 304. On the other hand, signal line driver circuit and scanning line driver circuit are protected only by a thin film 306 of oxide or nitride. Indicated by 307 is a sealant material. Therefore, TFTs 305 forming these driver circuits are placed in a harsher environment than the pixel TFTs located inside the liquid crystal material.

In an attempt to solve the foregoing problems and to obtain long-term reliability, a display device structure having improved reliability has been devised. In this structure, both signal line driver circuit and scanning line driver circuit are placed within a liquid crystal material, as well as pixel TFTs.

FIG. 4 shows a known device of this improved structure. In this known structure, a sealant material or sealing material 403 is located outside both a signal line driver circuit 401 and a scanning line driver circuit 402. Therefore, the driver circuit TFTs are covered by the liquid crystal material, as well as the pixel TFTS. Furthermore, to miniaturize the liquid crystal display, three end surfaces (in FIG. 4, the top end surface, bottom end surface, and right end surface) of the counter substrate are made to conform to three end surfaces of the TFT substrate. Indicated by 404 is a pixel matrix.

These two conventional structures suffer from the following problems.

As shown in FIG. 5, in the conventional active matrix liquid crystal display, a short ring 501 is formed around the pixel matrix to protect the TFT devices from static charges. Since the signal lines 503 and scanning lines 504 connected with pixel TFTs 502 are all shorted, static charges produced during manufacturing steps, especially during rubbing steps, are prevented from being applied across the terminals of each pixel TFT 502. Indicated by 505 is a TFT substrate. Indicated by 506 are positions at which the device is cut by a laser beam.

In the first-mentioned conventional structure shown in FIGS. 2 and 3, it is common practice to cut the short ring together with glass substrates with a laser beam or the like in the final manufacturing step for the liquid crystal display.

However, in the second-mentioned conventional structure, in an attempt to minimize the size of the liquid crystal display, the counter substrate and the TFT substrate are preferably cut along common planes (in FIG. 4, the top end surface, bottom end surface, and right end surface of each substrate) from which no terminals are brought out. Accordingly, it is difficult to cut the short ring with a laser beam in the final step. In particular, the short ring is cut together with the substrates along a common plane. As shown in FIG. 6, after the cutting, the end surfaces of the substrates are exposed. If static charges are produced on the exposed end surface after the cutting, the internal pixel TFTs will be destroyed, thus making the display device defective. Indicated by 507 is the counter substrate. Indicated by 508 is a sealant material. Indicated by 503 is a liquid crystal material. Indicated by 504 is a bus line. Indicated by 505 is the TFT substrate. Indicated by 506 are the exposed end surfaces.

SUMMARY OF THE INVENTION

An active matrix liquid crystal display according to the invention is free of the foregoing problems and has a plurality of pixel TFTs arranged in rows and columns on a TFT substrate, driver TFTs formed on the TFT substrate and forming a driver circuit for driving the pixel TFTs, a counter substrate, and a liquid crystal material. The pixel TFTs and the driver TFTs are in contact with the liquid crystal material directly or via a thin film. A method of fabricating this active matrix liquid crystal display in accordance with the invention comprises the steps of: cutting at least one unexposed end surface of the substrates and the counter substrate along a common plane to form an exposed end surface; and applying or bonding a nonconductive or weakly conductive material to at least one of the exposed end surfaces.

DETAILED DESCRIPTION OF THE PREFERRED EMBODIMENTS

Figure 1:
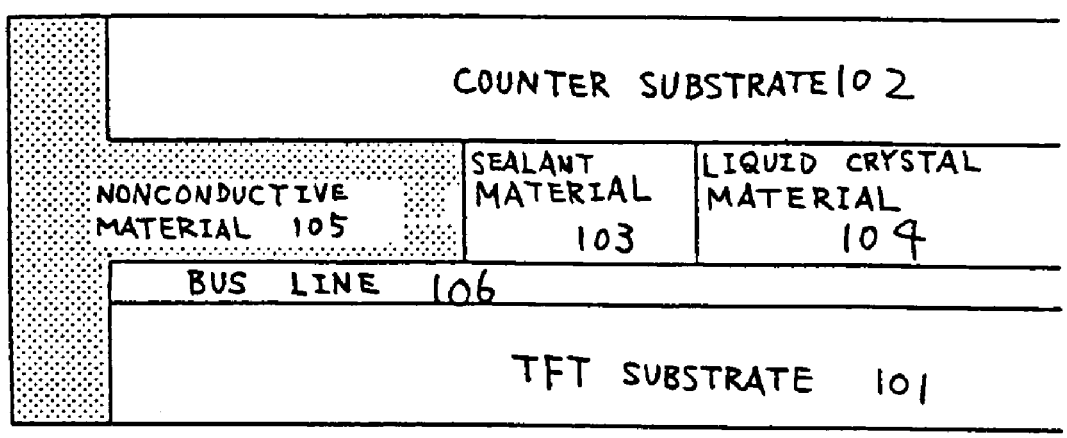
FIG. 1 is a cross-sectional view of an active matrix liquid crystal display according to the present invention.

A specific example of configuration of active matrix liquid crystal display obtained by making use of the above-described structure is shown in FIG. 1, where a plurality of pixel TFTs are arranged in rows and columns on a TFT substrate 101. Driver TFTs forming a driver circuit for driving the pixel TFTs are also formed on the TFT substrate. A liquid crystal material 104 is sealed between a counter substrate 102 and the TFT substrate 101 by a sealing material 103. Since the driver TFTs are present inside the liquid crystal material along with the pixel TFTs, the driver TFTs can be protected.

In one feature of the invention, after the counter substrate and TFT substrate are cut, a nonconductive or weakly conductive resin 105 is applied to the cut end surface of the short ring to prevent the cut end surfaces from touching the outside. Consequently, a bus line 106 connected with the pixel TFTs can be shielded from the outside. Hence, the pixel TFTs can be protected from static charges.

A method of fabricating LCD (liquid crystal display) panels using active matrix circuits according to the invention will hereinafter be described in its illustrated embodiments 1 and 2.

Embodiment 1

Manufacturing steps for obtaining a monolithic active matrix circuit of the present embodiment are now described by referring to FIGS. 7(A)–7(D). These are low-temperature polysilicon processes. The left half of each figure illustrates steps for fabricating TFTs forming a driver circuit. The right half illustrates steps for fabricating TFTs forming an active matrix circuit.

Figure 7A:
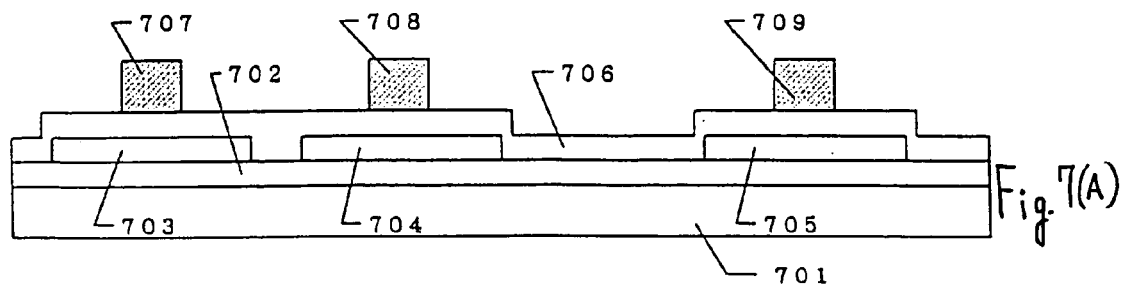
FIGS. 7(A)–7(D) and 8(A)–8(B) are cross-sectional views of a monolithic active matrix liquid crystal display according to the invention, illustrating its process sequence.
Figure 7B:
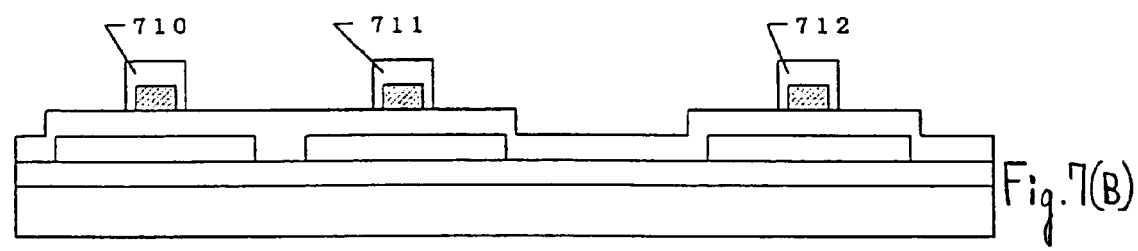
Figure 7C:
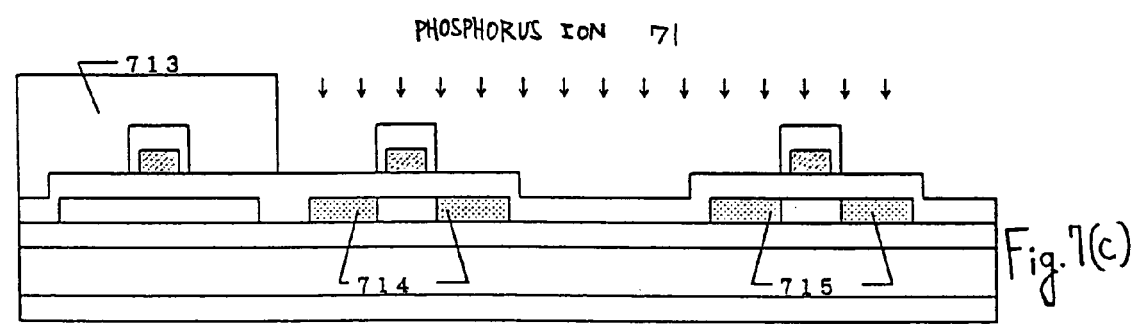
Figure 7D:
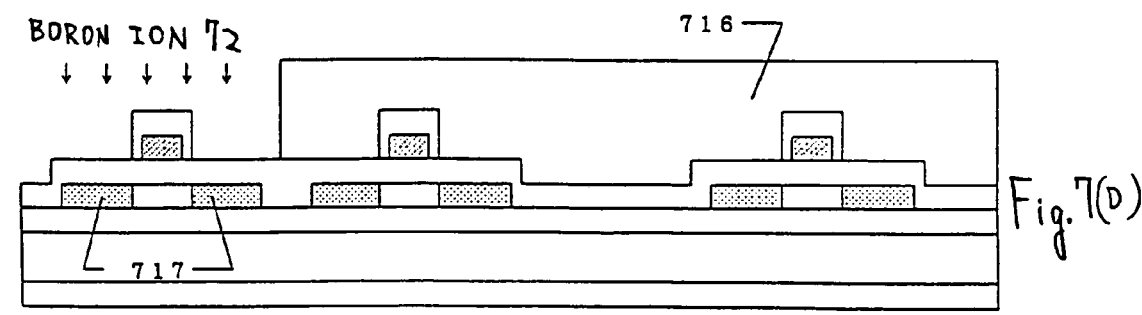

As shown in FIG. 7(A), a silicon oxide film 702 is first formed as a buffer layer 702 on a glass substrate 701 to a thickness of 1000 to 3000 Å. This silicon oxide film may be formed in an oxygen ambient by sputtering or plasma CVD. Then, an amorphous silicon film is formed to a thickness of 300 to 1500 Å, preferably 500 to 1000 Å, by plasma CVD or LPCVD.

The amorphous silicon film is thermally annealed at a temperature higher than 500° C., preferably 500–600° C., to crystallize the film or to enhance its crystallinity. After the crystallization, the crystallinity may be further enhanced by carrying out photo-annealing making use of laser light or the like. Furthermore, during the crystallization making use of the thermal annealing, an element (or, a catalytic element) such as nickel for promoting crystallization of silicon may be added, as described in Japanese Unexamined Patent Publication Nos. 244103/1994 and 244104/1994.

Then, the crystallized silicon film is etched to form islands of an active layer 703 for P-channel TFTs forming a driver circuit, islands of an active layer 704 for N-channel TFTs forming the driver circuit, and islands of an active layer 705 for pixel TFTs forming a matrix circuit. Furthermore, a gate-insulating film 706 of silicon oxide is formed to a thickness of 500 to 2000 Å by sputtering in an oxygen ambient. The gate-insulating film 706 may be formed by plasma CVD. Where the silicon oxide film is formed by plasma CVD, it is desired to use monosilane ($SiH_4$) and oxygen ($O_2$) or nitrogen monoxide ($N_2O$) as a gaseous raw material.

Subsequently, an aluminum layer having a thickness of 2000 to 6000 Å is formed by sputtering over the whole surface of the laminate. The aluminum may contain silicon, scandium, palladium, or other material to prevent generation of hillocks in thermal processing steps conducted later. The aluminum film is etched to form gate electrodes 707, 708, and 709 (FIG. 7(A)).

Thereafter, the gate electrodes 707, 708, and 709 consisting of aluminum is anodized. As a result, surfaces of the gate electrodes 707, 708, 709 are changed into aluminum oxide, 710, 711, and 712. These aluminum oxide regions act as an insulator (FIG. 7(B)).

Then, a photoresist mask 713 covering the active layer 703 of the P-channel TFTs is formed. Phosphorus ions are introduced into the active layers, 704 and 705, by ion doping while using phosphine as a dopant gas. The dose is $1\times10^{12}$ to $5\times10^{13}$ atoms/cm$^2$. As a result, heavily doped N-type regions 714, 715, or sources and drains, are formed in the active layers, 704 and 705 (FIG. 7(C)).

Thereafter, a photoresist mask 716 for covering both active layer 704 for the N-channel TFTs and active layer 705 for the pixel TFTs is formed. Boron ions 72 are introduced again into the active layer 703 by ion doping, using diborane ($B_2H_6$) as a dopant gas. The dose is $5\times10^{14}$ to $8\times10^{15}$ atoms/cm$^2$. As a result, heavily doped P-type regions 717 are formed. Because of the doping steps described thus far, heavily doped N-type regions 714, 715 (sources and drains) and heavily doped P-type regions 717 (source and drain) are formed (FIG. 7(D)).

Then, the laminate is thermally annealed at 450–850° C. for 0.5 to 3 hours to activate the dopants and to repair the damage created by the doping. In this way, the dopants are activated. At the same time, the crystallinity of the silicon is recovered.

Figure 8A:
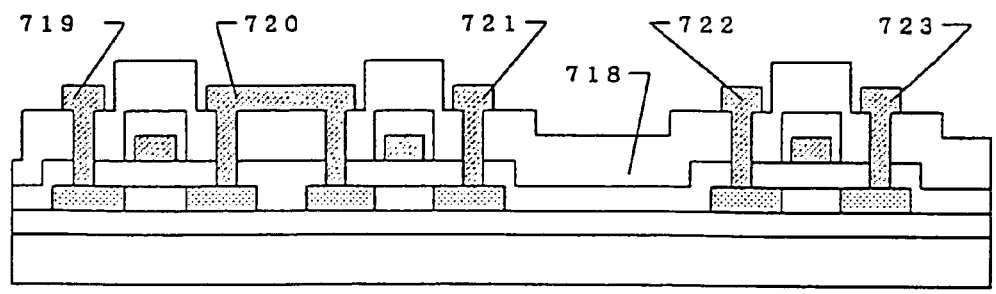

Thereafter, as shown in FIG. 8(A), a silicon oxide film having a thickness of 3000 to 6000 Å is formed as an interlayer dielectric 718 over the whole surface by plasma CVD. This interlayer dielectric 718 may be a monolayer of silicon nitride or a multilayer film of silicon oxide and silicon nitride. The interlayer dielectric 718 is etched by a wet etching process or a dry etching process to form contact holes in the source/drain regions.

Then, an aluminum film or a multilayer film of titanium and aluminum is formed to a thickness of 2000 to 6000 Å by sputtering techniques. This film is etched so as to create electrodes/interconnects, 719, 720, and 721, for a peripheral circuit and electrodes/interconnects, 722 and 723, for pixel TFTs (FIG. 8(A)).

Figure 8B:
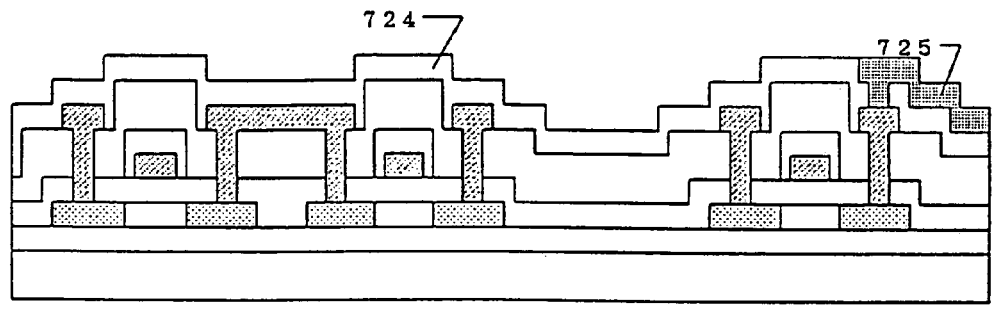

Subsequently, a silicon nitride film 724 is formed as a passivation film having a thickness of 1000 to 3000 Å by plasma CVD. This silicon nitride film is etched to create contact holes extending to the electrodes 723 of the pixel TFTs. An ITO (indium-tin oxide) film having a thickness of 500 to 1500 Å is formed by sputtering. Finally, the ITO film is etched to form pixel electrodes 725. In this manner, the peripheral driver circuit 726 and active matrix circuit 727 are formed integrally (FIG. 8(B)).

Steps for assembling the active matrix liquid crystal display is now described. The TFT substrate and the counter substrate are cleaned to clean up chemicals etc.

Then, an orientation film is made to adhere to each of the TFT substrate and counter substrate. The orientation film is provided with grooves lying in a given direction. Liquid crystal molecules are oriented uniformly along the grooves. The orientation film material is created by preparing a solvent such as butyl Cellosolve or n-methyl-pyrrolidone and dissolving about 10% by weight of polyimide in the solvent. This is referred to as polyimide varnish and printed with a flexo-printing machine.

The orientation films adhering to the TFT substrate and the counter substrate, respectively, are heated to cure them. This is known as baking. For this purpose, hot air having a maximum temperature of approximately 300° C. is blown against the orientation films to heat them. As a result, the polyimide varnish is sintered and cured. Then, a rubbing step is carried out. Each glass substrate having the orientation film adhering thereto is rubbed in a given direction with buff cloth consisting of fibers of rayon, nylon, or the like having fiber lengths of 2 to 3 mm to form minute grooves.

Spherical spacers of a polymer-, glass-, or silica-based material are sprayed either at the TFT substrate or at the counter substrate. The method of spraying the spacers can be a wet process in which spacers are mixed into a solvent such as pure water or alcohol and the solvent is sprayed onto the glass substrate. The method can also be a dry process in which spacers are sprayed without using solvent at all.

Thereafter, a sealant material is applied to the outer frame of the pixel region of the TFT substrate, in order to bond together the TFT substrate and the counter substrate and to prevent the injected liquid crystal material from flowing out. The used sealant material is prepared by dissolving epoxy resin and a phenolic curing agent in a solvent of ethyl Cellosolve. After the application of the sealant material, the two glass substrates are bonded together by a high-temperature pressing process at 160° C. so that the sealant material is cured in about 3 hours.

Figure 2:
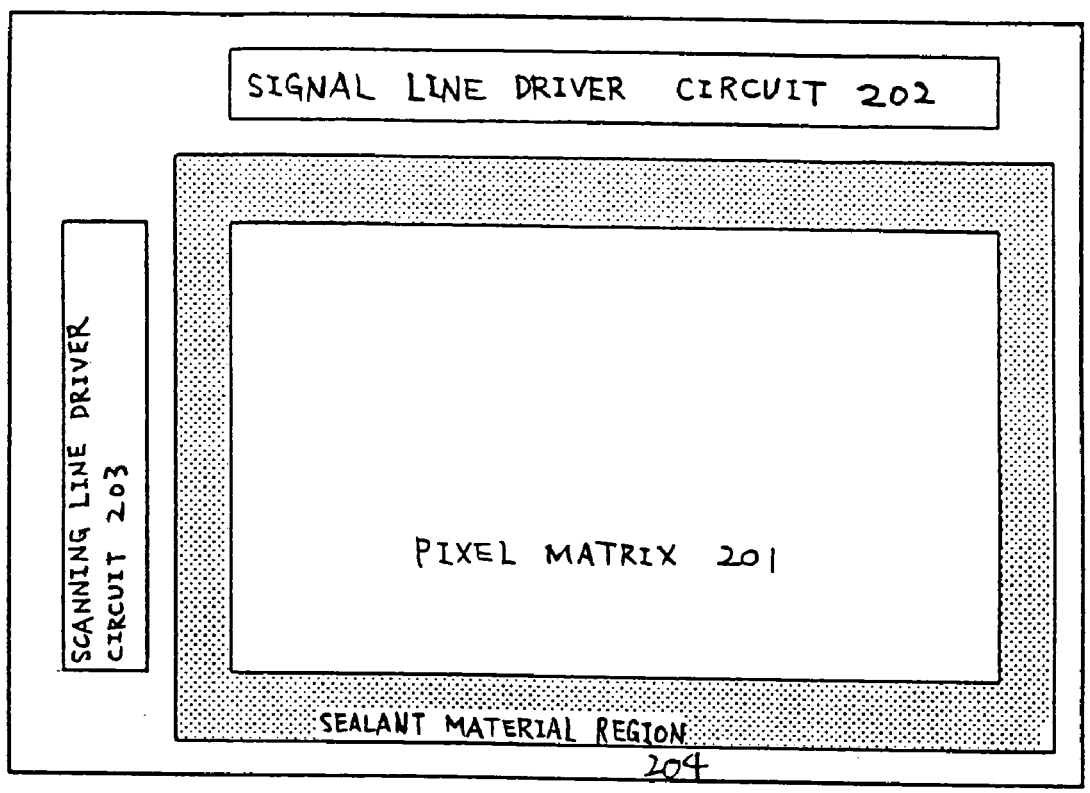
FIG. 2 is a schematic diagram of a conventional active matrix liquid crystal display.
Figure 3:
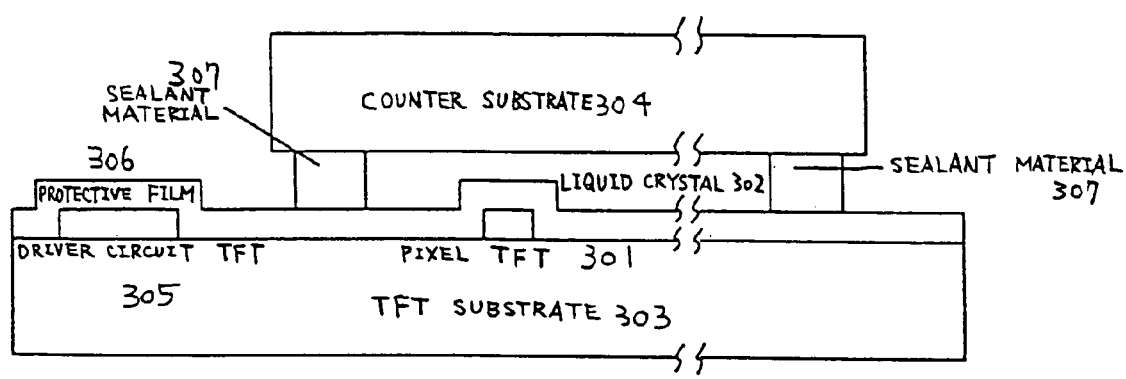
FIG. 3 is a cross-sectional view of the conventional active matrix liquid crystal display shown in FIG. 2.
Figure 4:
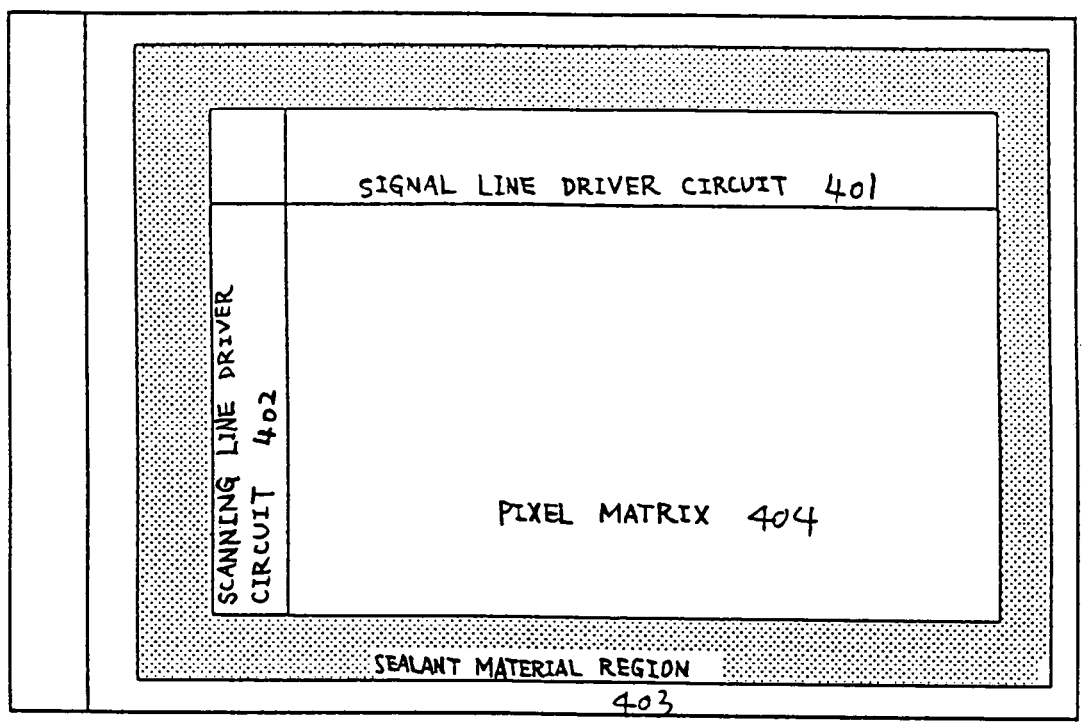
FIG. 4 is a diagram of another conventional active matrix liquid crystal display.
Figure 5:
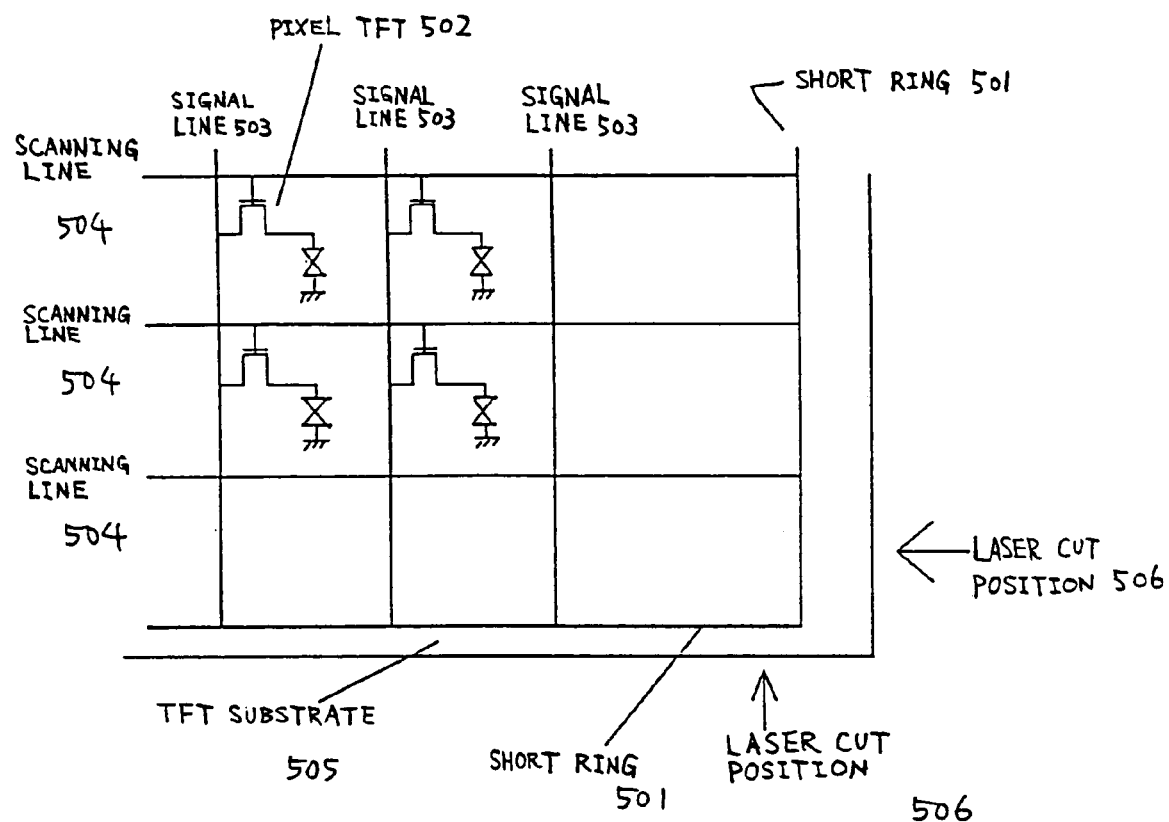
FIG. 5 is a diagram of a short ring used in a known active matrix liquid crystal display.
Figure 6:
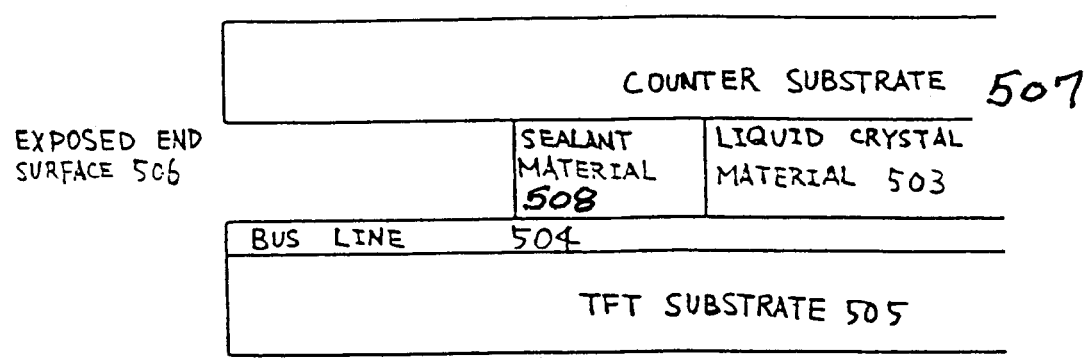
FIG. 6 is a cross-sectional view of the conventional active matrix liquid crystal display shown in FIG. 4.

Then, the TFT substrate and the counter substrate are bonded together. The liquid crystal material is injected through a liquid crystal injection port, followed by sealing of the port. After the completion of the sealing, the glass substrates, or the TFT substrate and counter substrate, are cut along the common planes lying in three directions (top side, bottom side, and right side of the display device shown in FIG. 2).

Subsequently, a nonconductive or weakly conductive resin is applied to the cut surfaces. For example, an epoxy resin is applied. As a result of the manufacturing steps described thus far, the liquid crystal display shown in FIG. 1 is completed.

Embodiment 2

Figure 9:
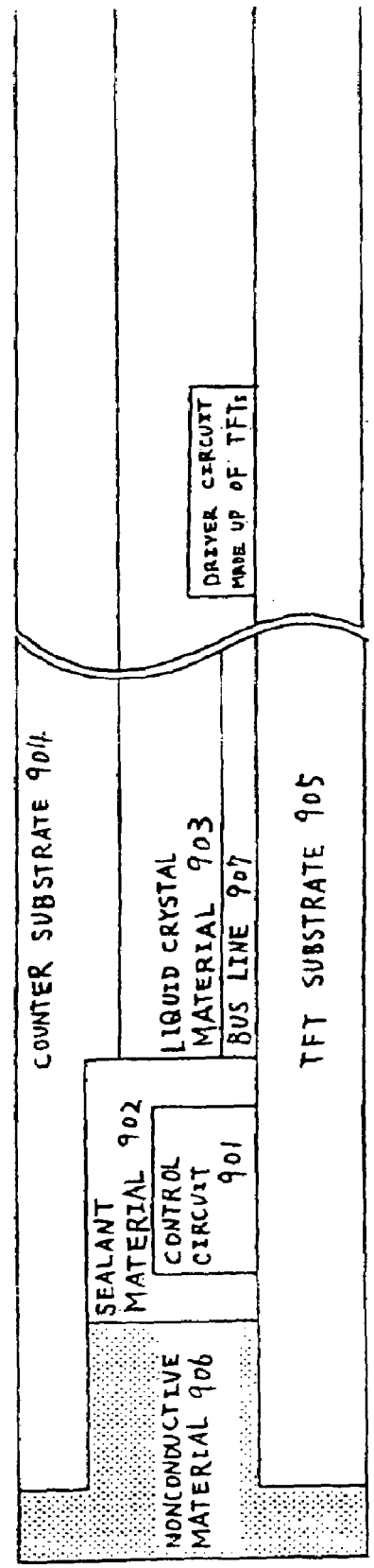
FIG. 9 is a cross-sectional view of another active matrix liquid crystal display according to the invention.

A second embodiment of the invention is shown in FIG. 9. In this embodiment, a control circuit 901 for controlling a driver circuit made up of TFTs is located under a sealant material 902 to reduce the packing area and to enhance the reliability. Normally, the control circuit 901 is made of a single-crystal silicon chip and thicker than a layer of a liquid crystal material 903. Therefore, it is impossible to place the control circuit in the sealant material 902 as it is. Accordingly, in the present embodiment, a counter substrate 904 is made thinner by an amount equal to the height of the protruding portion of the control circuit above the substrate gap to accommodate this problem. Indicated by 906 is a nonconductive material. Indicated by 907 is a bus line.

Instead of reducing the thickness of the counter substrate, the thickness of the TFT substrate 905 may be reduced. Alternatively, thicknesses of both counter substrate 904 and TFT substrate 905 may be reduced.

The control circuit 901 for controlling the aforementioned driver circuit is mounted on the TFT substrate 905 by COG (chip-on-glass) technology. This COG technology is carried out either by a wire bonding operation in which the rear surface of the control circuit chip is bonded to the TFT substrate 905 and electrically connected with the conductors on the TFT substrate by wire bonding, or by a face-down operation in which the chip is turned upside down and the pads on the chip are connected with the conductors on the TFT substrate by conductive paste or the like.

The TFT substrate 905 and the counter substrate 904 may be partially thinned by previously mechanically grinding away or chemically etching away portions of the counter substrate of interest.

In the present invention, the driver TFTs are hermetically sealed in a liquid crystal, as well as the pixel TFTs, as described above. Therefore, the temperature resistance and the contamination resistance of the driver TFTs can be improved. Furthermore, the active matrix liquid crystal display can be miniaturized.

In addition, a nonconductive or weakly conductive resin is applied or bonded to the cut surfaces of the substrates. Hence, the reliability, especially the reliability against electrostatic damage, can be enhanced.

Moreover, in the present invention, all necessary circuits including a control circuit for a driver circuit, can be placed between a pair of substrates by partially thinning at least one of TFT and counter substrates. Further, the active matrix liquid crystal display can be reduced in size by sealing these circuits in a liquid crystal material. Also, the reliability can be improved.

What is claimed is:

1. An active matrix liquid crystal display comprising:
   a plurality of pixel TFTs arranged in rows and columns over a TFT substrate and arrayed in a matrix;
   a counter substrate located opposite to said TFT substrate;
   a layer of a liquid crystal material provided between said TFT substrate and said counter substrate;
   a sealing material sealing around said liquid crystal material and provided between said TFT substrate and said counter substrate;
   a driver TFT provided over said TFT substrate; and
   a control circuit comprising a control circuit chip sealed in said sealing material, said control circuit being provided over said TFT substrate for controlling said driver TFT,
   wherein at least one of a portion of said TFT substrate over which said control circuit chip is provided and a portion of said counter substrate adjacent to said control circuit is made thinner than other portions of said TFT substrate and said counter substrate.

2. The display of claim 1, wherein in order to install said control circuit in a control circuit accommodation portion of said TFT substrate, said control circuit accommodation portion is made thinner than other portions of said TFT substrate.

3. The display of claim 1, wherein said control circuit is packed over said TFT substrate by COG (chip-on-glass) technology.

4. An active matrix liquid crystal display comprising:
   a plurality of pixel TFTs arranged in rows and columns over a TFT substrate and arrayed in a matrix;
   a bus line provided over said TFT substrate and connected with at least one of said pixel TFTs;
   a counter substrate located opposite to said TFT substrate;
   a layer of a liquid crystal material provided between said TFT substrate and said counter substrate;
   a sealing material sealing around said liquid crystal material and provided between said TFT substrate and said counter substrate;
   a driver TFT provided over said TFT substrate; and
   a control circuit comprising a control circuit chip sealed in said sealing material, said control circuit provided over said TFT substrate for controlling said driver TFT, wherein at least one of a portion of said TFT substrate over which said control circuit chip is provided and a portion of said counter substrate adjacent to said control circuit is made thinner than other portions of said TFT substrate and said counter substrate.

5. The display of claim 4, wherein in order to install said control circuit in a control circuit accommodation portion of said TFT substrate, said counter substrate has a thinned portion located opposite to said control circuit accommodation portion.

6. The display of claim 4, wherein said control circuit is packed over said TFT substrate by COG (chip-on-glass) technology.

7. An active matrix liquid crystal display comprising:
a plurality of pixel TFTs arranged in rows and columns over a TFT substrate and arrayed in a matrix;
a counter substrate located opposite to said TFT substrate;
a layer of a liquid crystal material provided between said TFT substrate and said counter substrate;
a sealing material sealing around said liquid crystal material and provided between said TFT substrate and said counter substrate, said sealing material being provided outside at least said pixel TFTs;
a driver TFT provided over said TFT substrate; and
a control circuit comprising a control circuit chip sealed in said sealing material, said control circuit provided over said TFT substrate for controlling said driver TFT,
wherein at least one of a portion of said TFT substrate over which said control circuit chip is provided and a portion of said counter substrate adjacent to said control circuit is made thinner than other portions of said TFT substrate and said counter substrate.

8. The display of claim 7, wherein in order to install said control circuit in a control circuit accommodation portion of said TFT substrate, said counter substrate has a thinned portion located opposite to said control circuit accommodation portion.

9. The display of claim 7, wherein said control circuit is packed over said TFT substrate by COG (chip-on-glass) technology.

10. An active matrix liquid crystal display comprising:
a plurality of pixel TFTs arranged in rows and columns over a TFT substrate and arrayed in a matrix;
a bus line provided over said TFT substrate and connected with at least one of said pixel TFTs;
a counter substrate located opposite to said TFT substrate;
a layer of a liquid crystal material provided between said TFT substrate and said counter substrate;
a sealing material sealing around said liquid crystal material and provided between said TFT substrate and said counter substrate, said sealing material being provided outside at least said pixel TFTs;
a driver TFT provided over said TFT substrate; and
a control circuit comprising a control circuit chip sealed in said sealing material, said control circuit provided over said TFT substrate for controlling said driver TFT,
wherein at least one of a portion of said TFT substrate over which said control circuit chip, is provided and a portion of said counter substrate adjacent to said control circuit is made thinner than other portions of said TFT substrate and said counter substrate.

11. The display of claim 10, wherein in order to install said control circuit in a control circuit accommodation portion of said TFT substrate, said counter substrate has a thinned portion located opposite to said control circuit accommodation portion.

12. The display of claim 10, wherein said control circuit is packed over said TFT substrate by COG (chip-on-glass) technology.

13. A method of fabricating an active matrix liquid crystal display comprising:
a plurality of pixel TFTs arranged in rows and columns over a TFT substrate and arrayed in a matrix;
a bus line provided over said TFT substrate and connected with at least one of said pixel TFTs;
a counter substrate located opposite to said TFT substrate;
a layer of a liquid crystal material provided between said TFT substrate and said counter substrate;
a sealing material sealing around said liquid crystal material and provided between said TFT substrate and said counter substrate and outside at least said pixel TFTs;
a driver TFT provided over said TFT substrate; and
a control circuit comprising a control circuit chip sealed in said sealing material, said control circuit provided over said TFT substrate for controlling said driver TFT,
said method comprising:
cutting said TFT substrate and said counter substrate outside said sealing material having said control circuit sealed in said sealing material,
wherein at least one of a portion of said TFT substrate over which said control circuit chip is provided and a portion of said counter substrate adjacent to said control circuit is made thinner than other portions of said TFT substrate and said counter substrate.

14. The method of claim 13, further comprising the step of thinning a portion of said counter substrate which is located opposite to a control circuit for controlling said driver circuit made up of said driver TFTs, to install said control circuit.

15. The method of claim 13, wherein said control circuit is packed over said TFT substrate by COG (chip-on-glass) technology.

16. A method of fabricating an active matrix liquid crystal display comprising:
a plurality of pixel TFTs arranged in rows and columns over a TFT substrate and arrayed in a matrix;
a bus line provided over said TFT substrate and connected with at least one of said pixel TFTs;
a counter substrate located opposite to said TFT substrate;
a layer of a liquid crystal material provided between said TFT substrate and said counter substrate;
a sealing material sealing around said liquid crystal material and provided between said TFT substrate and said counter substrate;
a driver TFT provided over said TFT substrate; and
a control circuit comprising a control circuit chip sealed in said sealing material, said control circuit provided over said TFT substrate for controlling said driver TFT,
said method comprising:
cutting said TFT substrate and said counter substrate outside said sealing material having said control circuit sealed in said sealing material,
wherein at least one of a portion of said TFT substrate over which said control circuit chip is provided and a portion of said counter substrate adjacent to said control circuit is made thinner than other portions of said TFT substrate and said counter substrate.

17. The method of claim 16, further comprising the step of thinning a portion of said counter substrate which is located opposite to said control circuit, to install said control circuit.

18. A semiconductor device including one liquid crystal panel comprising a TFT substrate and a counter substrate, wherein said TFT substrate and said counter substrate each comprises a first side edge, a second side edge, a third side edge, and a fourth side edge;

wherein said TFT substrate comprises a glass; and wherein said counter substrate is located opposite to said TFT substrate, said semiconductor device comprising:

a pixel TFT provided over said TFT substrate;

a channel formation region provided in a semiconductor film provided over said TFT substrate;

a gate electrode provided adjacent to said channel formation region with a gate insulating film therebetween, said pixel TFT comprising said channel formation region and said gate electrode and said gate insulating film;

a bus line provided over said TFT substrate and connected with said pixel TFT, said bus line having a part located adjacent to at least one of the first side edge, the second side edge and the third side edge of said TFT substrate;

a sealing material provided between said TFT substrate and said counter substrate; and a nonconductive material applied to the first side edge, the second side edge, and the third side edge of said TFT substrate and said counter substrate of said liquid crystal panel, wherein said nonconductive material is provided on an outer side of said sealing material, wherein said nonconductive material is not applied to the fourth side edge of said TFT substrate and said counter substrate of said liquid crystal panel, and wherein said nonconductive material covers the part of the bus line.

19. A semiconductor device including one liquid crystal panel comprising a TFT substrate and a counter substrate, wherein said TFT substrate and said counter substrate each comprises a first side edge, a second side edge, a third side edge, and a fourth side edge;

wherein said TFT substrate comprises a glass; and wherein said counter substrate is located opposite to said TFT substrate, said semiconductor device comprising:

a pixel TFT provided over said TFT substrate;

a channel formation region provided in a semiconductor film provided over said TFT substrate;

a gate electrode provided adjacent to said channel formation region with a gate insulating film therebetween, said pixel TFT comprising said channel formation region and said gate electrode and said gate insulating film;

a bus line provided over said TFT substrate and connected with said pixel TFT, said bus line having a part located adjacent to a side edge at least one of the first side edge, the second side edge and the third side edge of said TFT substrate;

a sealing material provided between said TFT substrate and said counter substrate; and a weakly conductive material applied to the first side edge, the second side edge, and the third side edge of said TFT substrate and said counter substrate of said liquid crystal panel, wherein said weakly conductive material is provided on an outer side of said sealing material, wherein said weakly conductive material is not applied to the fourth side edge of said TFT substrate and said counter substrate of said liquid crystal panel, and wherein said weakly conductive material covers the part of the bus line.

20. A semiconductor device including one liquid crystal panel comprising a TFT substrate and a counter substrate, wherein said TFT substrate and said counter substrate each comprises a first side edge, a second side edge, a third side edge, and a fourth side edge;

wherein said TFT substrate comprises a glass; and wherein said counter substrate is located opposite to said TFT substrate, said semiconductor device comprising:

a pixel TFT provided over a TFT substrate;

a channel formation region provided in a semiconductor film provided over said TFT substrate;

a gate electrode provided adjacent to said channel formation region with a gate insulating film therebetween, said pixel TFT comprising said channel formation region and said gate electrode and said gate insulating film;

a driver TFT provided over said TFT substrate;

a bus line provided over said TFT substrate and connected with said pixel TFT, said bus line having a part located adjacent to at least one of the first side edge, the second side edge and the third side edge of said TFT substrate;

a sealing material provided between said TFT substrate and said counter substrate; and a nonconductive material applied to the first side edge, the second side edge, and the third side edge of said TFT substrate and said counter substrate of said liquid crystal panel, wherein said nonconductive material is provided on an outer side of said sealing material, wherein said nonconductive material is not applied to the fourth side edge of said TFT substrate and said counter substrate of said liquid crystal panel, and wherein said nonconductive material covers the part of the bus line.

21. A semiconductor device including one liquid crystal panel comprising a TFT substrate and a counter substrate, wherein said TFT substrate and said counter substrate each comprises a first side edge, a second side edge, a third side edge, and a fourth side edge;

wherein said TFT substrate comprises a glass; and wherein said counter substrate located opposite to said TFT substrate, said semiconductor device comprising:

a pixel TFT provided over a TFT substrate;

a channel formation region provided in a semiconductor film provided over said TFT substrate;

a gate electrode provided adjacent to said channel formation region with a gate insulating film therebetween, said pixel TFT comprising said channel formation region and said gate electrode and said gate insulating film;

a driver TFT provided over said TFT substrate;

a bus line provided over said TFT substrate and connected with said pixel TFT, said bus line having a part located adjacent to at least one of the first side edge, the second side edge and the third side edge of said TFT substrate;

a sealing material provided between said TFT substrate and said counter substrate; and a weakly conductive material applied to the first side edge, the second side edge, and the third side edge of said TFT substrate and said counter substrate of said liquid crystal panel, wherein said weakly conductive material is provided on an outer side of said sealing material, and wherein said weakly conductive material is not applied to the fourth side edge of said TFT substrate and said counter substrate of said liquid crystal panel, and wherein said weakly conductive material covers the part of the bus line.

* * * * *